Sept. 4, 1945.   J. M. PULEO ET AL   2,384,195
REMOTE CONTROL FOR VARYING ELECTRIC WELDING RESISTANCE
Filed Sept. 18, 1943   3 Sheets-Sheet 1
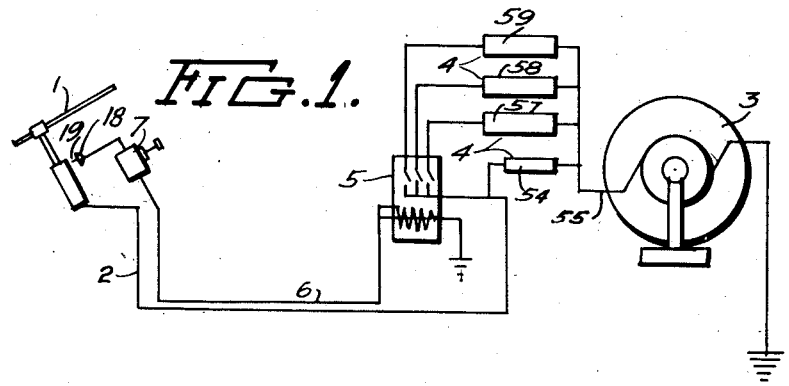
FIG. 1.
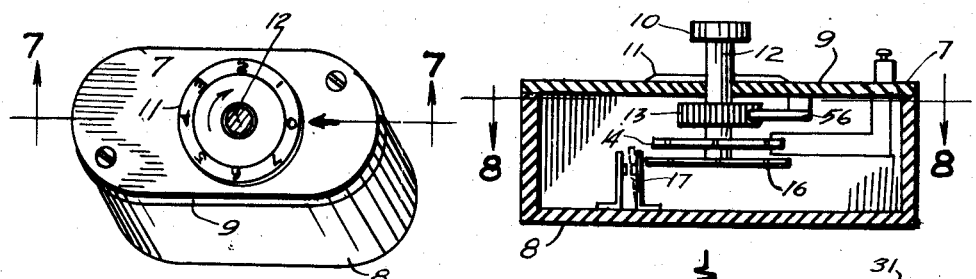
FIG. 7.
FIG. 6.
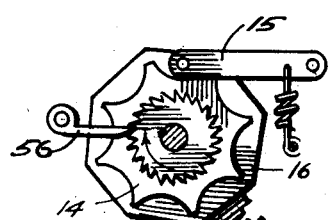
FIG. 8.
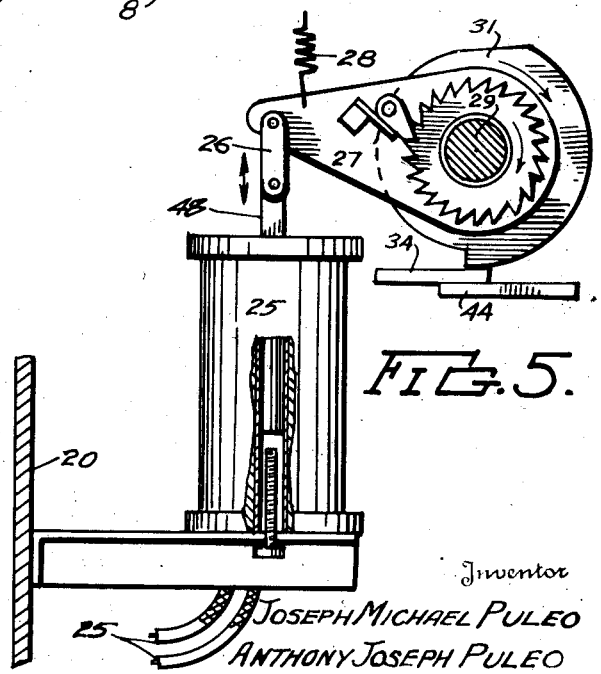
FIG. 5.
Inventor
JOSEPH MICHAEL PULEO
ANTHONY JOSEPH PULEO
By Howard J. Whelan
Attorney Inventor
JOSEPH MICHAEL PULEO.
ANTHONY JOSEPH PULEO.
By Howard J. Whelan.
Attorney Sept. 4, 1945. J. M. PULEO ET AL 2,384,195
REMOTE CONTROL FOR VARYING ELECTRIC WELDING RESISTANCE
Filed Sept. 18, 1943 3 Sheets-Sheet 3

Inventor
JOSEPH MICHAEL PULEO.
ANTHONY JOSEPH PULEO.
By Howard J. Whelan.
Attorney Patented Sept. 4, 1945

2,384,195

UNITED STATES PATENT OFFICE 2,384,195

REMOTE CONTROL FOR VARYING ELECTRIC WELDING RESISTANCE

Joseph Michael Puleo, Dundalk, and Anthony Joseph Puleo, Baltimore, Md.

Application September 18, 1943, Serial No. 502,932

2 Claims. (Cl. 201—48)

This invention refers to welding equipment and more particularly to a device for remote control of the same. It is customary in welding for situations to arise, wherein the amount of welding current required varies according to the metals worked on, and the drop in amperage caused thereby affects the welding current used on the torches, and incidentally the quality of the work done by the latter. The operator of the torch is then compelled to leave his work and in some manner increase or modify the current for his equipment. This frequently consumes considerable time and effort and interferes materially with the work being done by him. The object of this invention is to provide a method and device that will enable the operator to personally and specifically handle the situation from the site where he is actually working, and without moving therefrom, and do so in a very convenient and expeditious manner.

This invention consists in general of a system employing a multi-point switch with a single wire running therefrom to a control unit located adjacent to the equipment providing the welding current, and connected to the latter's conventional controlling devices so as to operate same. The operator actuates the switch at his place of working so the circuit it controls, will operate the unit and bring the controlling current from the said equipment up or down to meet the requirements required for the occasion. The operation is simple and the switch is preferably carried around in the pocket of the welder, ready to be attached to a control circuit wire brought in with the welding cable, so that wherever he welds, he will be able to quickly attach it and take care of his needs as to current, in an effective and simple manner.

In order to attain these objects and exemplify the structures of the devices embodying the invention, described herein, reference is made to the attached drawings in which:

Figure 1 is a diagrammatic view of the welding system embodying this invention;

Figure 5 is a detail of the solenoid propeller used in this unit for operating the latter's controlling circuit, contact mechanism;

Figure 6 is a view in perspective of a multipoint switch used in cooperation with the unit;

Figure 7 is a sectional elevation of the switch taken along top on line 7—7 of Figure 6;

Figure 8 is a sectional plan view of the switch mechanism, taken along line 8—8 of Figure 7.

Similar reference characters refer to similar parts throughout the drawings.

Figures 2, 3, 4:
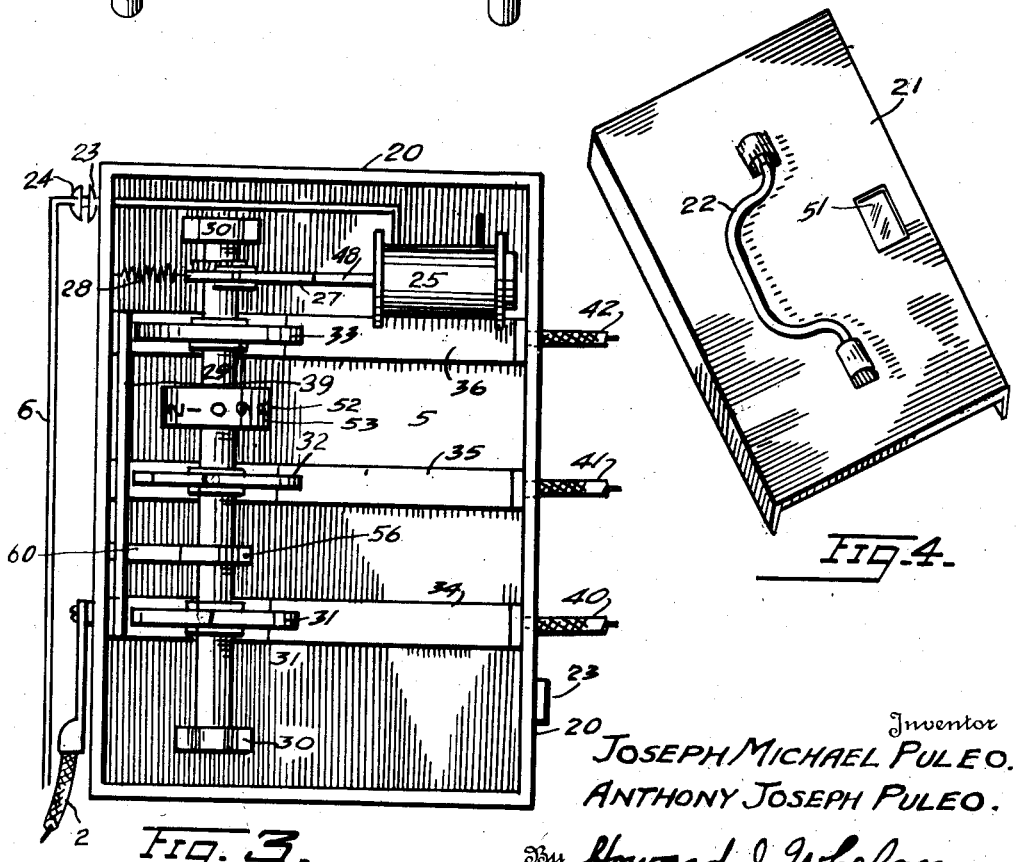
Figure 2 is a detail in perspective of the control unit employed in this system, to operate the resistors etc. that control the equipment supplying current for welding, parts being broken away to indicate the interior construction.
Figure 3 is a plan view of the unit indicated in Figure 2, with cover removed.
Figure 4 is a detail of the cover for the unit.

In the construction indicated in the drawings, 1 represents a conventional welding torch; 2 its current-supplying cable; and 3 the current-supplying equipment for the welding operations, to be controlled. The equipment 3 is controlled by resistors 4 and other conventional devices. These resistors and devices are controlled through the use of an auxiliary control unit 5 of this invention, located closely. The unit, in turn, is operated through a circuit wire 6 that receives its electric operating current from a fixed resistor 54 connected with feeder 55. The wire 6 is opened and closed by a switch 7, this switch consists of an insulated or plastic casing 8 having a removable cover 9 on which the handle 10, and index 11, are front mounted. The handle is mounted on a central stem 12 that extends through the cover and through a ratchet gear 13 and finger 56 and an eight-toothed sprocket 14, is connected or coupled by a pawl 15 to time mechanism 16, to respectively open and close contacts 17 that serve the circuit, to energise the solenoid. This switch is made compact and substantial so that it may be carried in the pocket when not in use. It may be easily attached, through the use of plugs 18 in sleeves 19 when it is to be made ready for use.

The auxiliary control unit 5, consists in general, of a cabinet 20 with a cover 21 and handle 22 for carrying it when the cover is bolted on. Electric plug socket 23 extends through the side wall for connection 24 to be made to the solenoid coil 25, mounted inside the casing, in a rigid manner. The solenoid has an extension core member 48 attached to it, which operates a loose link 26 and an eccentric-like member 27 against a coil spring 28 tension. The member 27 encircles a shaft 29 supported horizontally in the casing on bearings 30. This member frictionally ratchets the shaft to rotate it, in the direction as indicated. The bearings stand on the bottom of the casing and support the shaft. Cam elements 31, 32, and 33 are keyed or secured at spaced intervals on the shaft 29 and rotate with it. The peripheral face of the cams are designed to contact resilient plates 34, 35 and 36 respectively in a manner designed to suit the operation of the unit in opening and closing the resistor circuits. These plates are supported on insulating blocks 37 and held in place by screws 38. They make electrical contact with other, auxiliary plates 44, 45 and 46 when pressed down by the cams. The auxiliary plates connect inside the cabinet to a common bus-bar 39 and this in turn feeds through a cable 2 to the welding tool. The switches formed by the plates serve to open and close the circuits from the resistors to the welding tool or torch. The plates 34, 35 and 36 are tied into cables 40, 41 and 42 respectively which lead from the resistors 57, 58 and 59. The cabinet is supported on legs to keep it insulated and away from the ground. The cover 21 of the cabinet has a window 51 situated over the shaft 29 so that numbers 52 on the indicator wheel 53 can be observed through it. These numbers agree with those on the switch index, and identify the position of the cams at all times.

The operation of the device is performed as follows: The operator determines the cam setting from indicator wheel 53 and sets his switch accordingly, he then connects the switch 7 to the control unit 5 by plugging in the connectors of the circuit 6. The connections to plates 34, 35 and 36 are connected to the circuits controlling the resistors 4, etc. The cable 2 is connected to the bus-bar 39, which is fed from auxiliary contacts 44, 45 and 46. He then moves the switch until its index and the indicator wheel shows "0." He then turns the handle 10 of switch 7 from the first point "0" marked on the index to the second point marked "1." This closes the solenoid circuit and turns the shaft and its cam one-eighth of a turn and closes that circuit from the resistor to the welding torch. If the amount of current received is not sufficient he turns the switch to the next point, and so on until he gets the necessary results in the amount of current needed for the particular job to be done. The switch used in this device has eight points, and the cams are designed for that number of operations. The position of the cams and their effect on the amount of electrical current supplied varies with the changes of the switch handle 10. The switch on being closed each time induces the solenoid to pull its ratchet mechanism 27 and rotate the shaft 29 one setting, at each turn of the handle 10. The first step is "0" and opens the circuit.

This makes the cams turn also, but as the latter are of different shapes and are placed in different positions on the shaft, they make their contacts at various times, in accordance with their individual position, and as apparent in drawing 5. The cams are preferably connected up with the resistors to introduce or remove resistance in the current from the generators. Thus if the first resistor is 60 amperes for cam 31; that of cam 32, 30 amperes and 15 amperes for cam 33, and the arrangement for contacting consecutive on the shaft; then the current induced by the cams will be as follows for the different points, registered as the switch is operated.

Position—
0 on index 11, will give 00.00 amps.
1 on index 11, will give 60 amps.
2 on index 11, will give 75 amps.
3 on index 11, will give 15 amps.
4 on index 11, will give 45 amps.
5 on index 11, will give 105 amps.
6 on index 11, will give 90 amps.
7 on index 11, will give 30 amps.

As the resistors are operated, they affect the current supplied to the torch, and make it more or less to suit the requirements for the latter. It is all done from the position where the user is located, regardless of how remote the equipment is located. All he does, is turn the switch at his torch until the current to his torch is of the required intensity. He can change the intensity as many times as may be necessary, as the switch is operable continually, in one direction, and therefore cannot get out of time with the rest of the equipment. When the user has completed his work, he disconnects the switch by pulling out the plugs, and puts it in his pocket until he is required to do more welding work.

Figure 9:
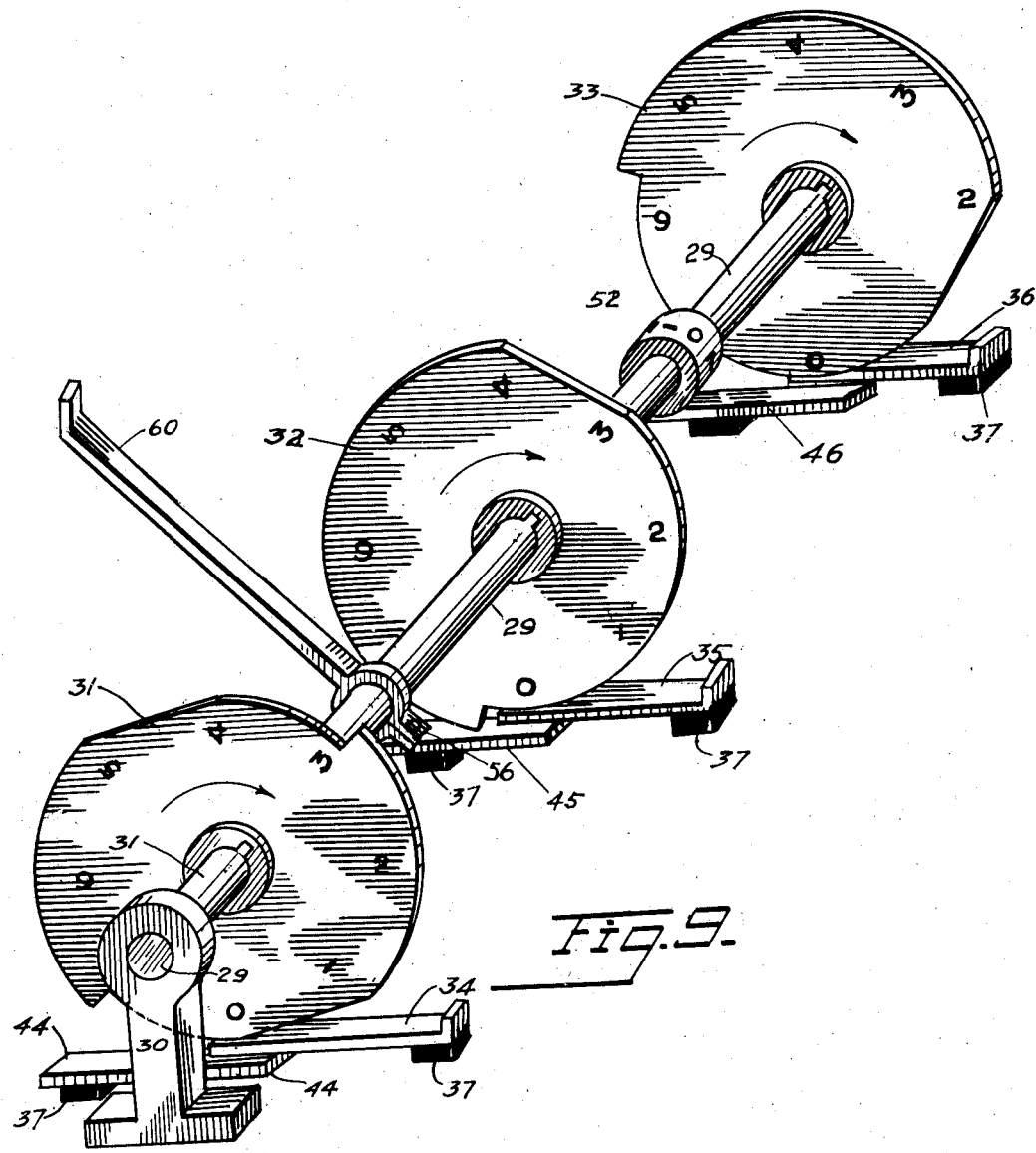
Figure 9 is a perspective detail of the shaft and cam used in the unit, marked to indicate the positions taken at various steps in their operation.

By noting the markings on Figure 9, the various positions of the cams during rotation may be noted, both as regards the switch operation and in relation to one another. Thus at position "0" on the switch and indicator wheel, the cams are all in the position where the circuits controlling the resistors from the unit are open. The next step brings the cam 31 into position where it causes the contact plates 34 and 44 to close and the resistor 57 to be inserted into the line and supply 60 amperes to the welding torch. The other cams and their respective contacts are open. At the next step in the rotation of the cam shaft the cam 31 and its contacts remain closed and cam 33 and contactors 36 and 46 close and allow the resistors 57 and 59 of 60 and 15 amperes capacity respectively to furnish 75 amperes to the welding line 2. At the next step in the rotation of the cam shaft the cam 31 rotates one eighth turn and allows the contactors 34 and 44 to open and cam 33 allows the contacts 36 and 46 to remain closed, all the others are open, this causes the 15 ampere resistor to remain in the line and feed 15 amperes to the welding torch. At the next step which will be the fourth, the cam 33 and contacts 36 and 46 remain closed allowing 15 amperes to continue in the line, and in addition, the cam 32 closes contacts 35 and 45 admitting 30 ampere resistor to pass its current into the line for a total of 45 amperes. At the fifth step the cams 32 and 33 and their respective contacts 35, 45 and 36, 46 remain closed, and cam 31 with its contacts 34 and 44 close admitting the three resistors to feed into the line 105 amperes. At the sixth step cam 33 and contacts 35 and 46 open and the others remain closed for a total current of 90 amperes. At the 7th position the cam 31 moves one-eighth revolution and opens contacts 34 and 44 allowing only 30 amperes to be fed into the welding line. The next step will be "0" which will open all lines. The indicator wheel numbers appear under the window 51 respectively, as the shaft and cams rotate into every position consecutively. This wheel consists of a collar that can be adjusted on the shaft longitudinally and rotatively and then be secured in place. A friction member binds the shaft 29 enough to dampen its turning action by the solenoid so it will not overshoot its mark by inertia when the current is cut off the solenoid by the switch. The screws serve to tighten or loosen on the split end portion for the purpose. It is usually termed the brake, but its action is to dampen the rotation of the shaft so it will not override its predetermined mark during rotation. It is secured to the casing by an arm 60. The solenoid is provided with an adjusting screw 57 that moves in and out of a bracket 58 on the solenoid. It is so placed in the solenoid that its free end contacts the inside end of the member 43. This is done so as to adjust and control the travel of same to suit the desired travel of the ratchet mechanism that turns the shaft 29. The screw limits the inner pull on the core member 43 and shortens or lengthens the movement of the ratchet arm. The shorter the movement of this arm the shorter will be the arc through which the shaft is rotated, as well as the cam elements and contactors thereon.

While but one form of the invention is shown in the drawings and described herein, it is not desired to limit this application for patent to such particular form, or in any other way, otherwise than limited by the principles of ths inventon and the scope of the appended clams.

Having thus described the invention, what is claimed is:

1. A control unit of the class described comprising in combination, a cabinet, a plurality of contact plates suspended and insulated in the cabinet and spaced from each other and independently arranged therein and provided for connections to resistors exteriorly located, auxiliary contact plates mounted in the cabinet and normally aligned but spaced therefrom so as to permit contact to be made between them when forced towards each other, a plurality of cam wheels rotatively suspended in the cabinet and aligned with the first mentioned contact plates so as to periodically press same against the auxiliary plates in predetermined sequence so as to vary the use of the resistors to make selective combinations therewith according to the form of the cam wheels and position relative to each other, a shaft supporting the cam shafts spaced and parallel with each other in the cabinet and adjacent to the said contact plates for making same connect with each other, and an indicator operated by the shaft for showing the setting of the contacts as the said cam wheels rotate, solenoid means in the cabinet for rotating the cam wheels and bringing their cam faces into contact with the contact plates aforesaid, for closing circuits to the resistors connected therewith in a conventional manner.

2. A control unit of the class described comprising in combination, a cabinet, a plurality of contact plates suspended and insulated in the cabinet and spaced from each other and independently arranged therein and provided for connections to resistors exteriorly located, auxiliary contact plates mounted in the cabinet and normally aligned but spaced therefrom so as to permit contact to be made between them when forced towards each other, a plurality of cam wheels rotatively suspended in the cabinet and aligned with first mentioned contact plates so as to periodically press same against the auxiliary plates in predetermined sequence so as to vary the use of the resistors to make selective combinations therewith according to the form of the cam wheels and position relative to each other, a shaft for supporting the cam shafts spaced and parallel with each other in the cabinet and adjacent to the said contact plates for making same connect with each other, and an indicator operated by the shaft for showing the setting of the contacts as the said cam wheels rotate, solenoid means in the cabinet for rotating the cam wheels and bringing their cam faces into contact with the contact plates aforesaid, for closing circuits to the resistors connected therewith in a conventional manner, and a ratchet and link mechanism operated through the solenoid and shaft revolving the same with the cam wheels thereon, and means for adjusting the cam wheels on the shaft to vary their relative positions thereon with regard to the sequence of operating the said plates.

JOSEPH MICHAEL PULEO.
ANTHONY JOSEPH PULEO.